United States Patent [19]
Mangle et al.

[11] Patent Number: 5,253,541
[45] Date of Patent: Oct. 19, 1993

[54] OIL WELL PUMPING MECHANISM

[75] Inventors: Kevin L. Mangle, Maple Grove; Arthur G. Erdman, New Brighton, both of Minn.

[73] Assignee: Regents of the University of Minnesota, Minneapolis, Minn.

[21] Appl. No.: 494,737

[22] Filed: Mar. 16, 1990

[51] Int. Cl.5 ............................... F16H 21/32
[52] U.S. Cl. ........................... 74/41; 74/45; 74/51
[58] Field of Search .......... 74/21, 26, 41, 44, 45, 74/51

[56] References Cited

U.S. PATENT DOCUMENTS

| | | | |
|---|---|---|---|
| 238,599 | 3/1881 | Lusk | 74/44 |
| 280,890 | 7/1883 | Wilson | 74/44 |
| 569,068 | 10/1896 | Smith et al. | 74/21 |
| 752,237 | 2/1904 | Lineback | 74/44 |
| 1,247,549 | 11/1917 | Landis | 74/44 |
| 1,891,552 | 12/1932 | McCrosky | 74/41 |
| 1,897,108 | 2/1933 | Black | 74/41 |
| 1,964,670 | 6/1934 | Minnich | 74/41 |
| 2,308,823 | 1/1943 | Phipps | 74/41 |
| 4,121,471 | 10/1978 | Chancellor | 74/41 |
| 4,671,126 | 6/1987 | Sable | 74/41 |
| 4,715,240 | 12/1987 | Erich | 74/52 |

OTHER PUBLICATIONS

P. 82 from W. Wunderlich, *Ebere Kinematic*, Hochscaltaschenbricken-Verley, Mannheim, 1970.
Thesis of Sridhar Kota, *Dwell Linkage Synthesis: Development of a Knowledge-based Interactive Computer Aided Design Tool*, 1987.

*Primary Examiner*—Allan D. Herrmann
*Assistant Examiner*—David W. Laub
*Attorney, Agent, or Firm*—Patterson & Keough

[57] ABSTRACT

A pumping mechanism particularly adapted for coupling a rotating prime mover to the sucker rod of an oil well lift pump is disclosed. A linkage assembly comprised of a V-shaped floating link and two grounded links provides straight line, reciprocating motion from a rotary input, without the massive horsehead cam and flexible cable employed by conventional oil well pumping units. A driving dyad coupled to the floating link connects the linkage assembly to the prime mover, and a counterweight is carried by one of the grounded links.

50 Claims, 4 Drawing Sheets

OIL WELL PUMPING MECHANISM

TECHNICAL FIELD

This invention relates to mechanisms for translating rotary mechanical motion into straight line, reciprocating motion. More specifically, it relates to a mechanism particularly adapted for coupling the sucker rod of an oil well lift pump to a rotating prime mover.

BACKGROUND ART

Many oil well pumping systems use a lift pump mechanism to draw oil from a well to ground level. Lift pumps operate by shifting a plunger in an up and down, reciprocating motion within the barrel of the pump. A standing valve in the pump cylinder and a traveling valve in the plunger permit fluid to be drawn upwardly through the pump as the plunger is raised, and prevent downward flow of fluid as the plunger is lowered.

Figures 1A, 1B, 1C:
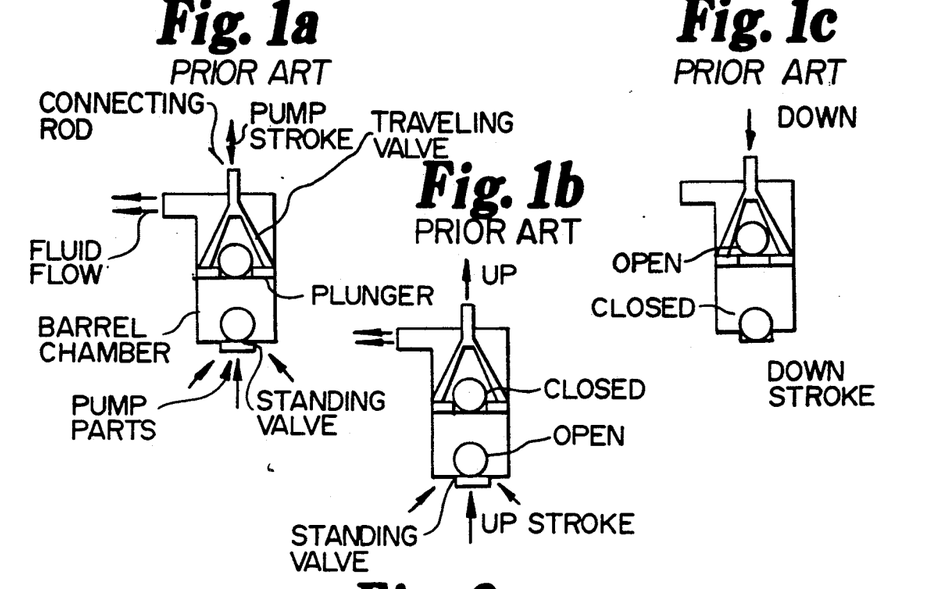
FIG. 1a depicts the valving system of a conventional lift pump.
FIG. 1b depicts the valving system of FIG. 1a in its upstroke configuration.
FIG. 1c depicts the valving system of FIG. 1a in its downstroke configuration.

FIG. 1a depicts parts of such a conventional lift pump, and FIGS. 1b and 1c show the lift pump in the upstroke and downstroke configurations respectively. Referring to FIGS. 1a, b and c, it will be seen that, on the upstroke, the standing valve is open and the traveling valve closes. The upstroke valve configuration is caused by the low pressure situation generated in the barrel chamber as the rod moves up. The low pressure sucks fluid into the barrel chamber, through the standing valve. On the downstroke, the standing valve can close and the traveling valve is open. The downstroke valve configuration is caused by the high pressure situation generated in the barrel chamber as the rod moves down. The plunger moves freely through the fluid, in the barrel chamber, on the downstroke.

Figure 2:
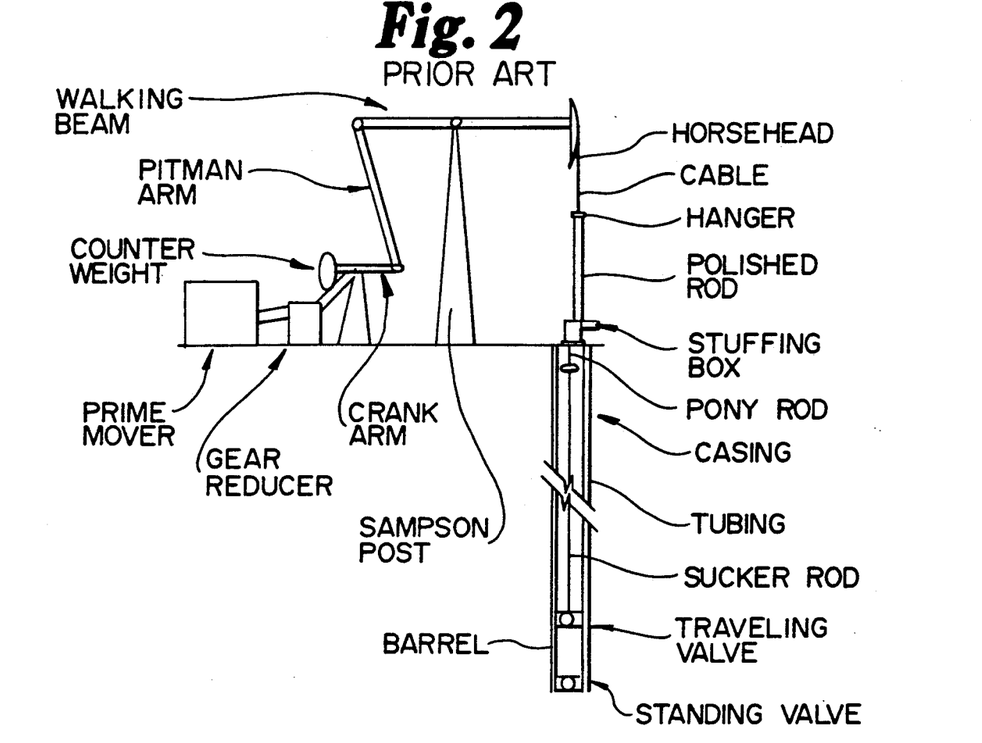
FIG. 2 is a schematic, side elevational view of a conventional pumping mechanism.

Oil well depths can be as great as 10,000 feet. A lift pump operating in such a well must be connected to a prime mover, mounted at ground level, by a sucker rod that extends the length of the well. The prime mover, typically an electrically induction driven motor, is coupled to the sucker rod by a pumping unit that translates the rotary motion of the motor into the straight line, up and down motion required to operate the sucker rod. Convenitonal pumping units comprise a simple lever (walking beam) with a rotating crank input, a cam element (horsehead), and a flexible cable that translate the pivoting motion of the walking beam into an essentially straight line, up and down output motion. FIG. 2 depicts such a conventional pumping unit.

The conventional pumping unit described above requires a relatively large walking beam to effect an adequate output stroke length. The resultant, relatively large "footprint", or area occupied by a conventional pumping unit, is particularly disadvantageous when designing off shore, platform mounted pumping mechanisms.

In addition to the space problems presented by conventional pumping units, the flexible cable required in conventional units presents reliability problems. In particular, the required wrapping up and down of the flexible cable around the horsehead, as the walking beam is pivoted back and forth, stresses and fatigues the flexible cable. Cables must therefore be periodically inspected, and replaced before they part. Parting of the cable could allow the sucker rod to descend unrestricted into the well, with the loss of the sucker rod and permanent inoperability of the well. Moreover, the cyclical rate of a pumping unit is limited by the use of a flexible cable, since the downstroke of the cable at the horsehead can at no instant be faster than the free fall descent of the sucker rod within the well. If the downstroke were faster than the descent of the sucker rod, the flexible cable would first slacken, and then would be abruptly tightened as the walking beam slowed down in readiness for the upward stroke.

Notwithstanding the above noted limitations, replacements for the conventional pumping unit having a walking beam, horsehead, and flexible cable have not been forthcoming. It will be appreciated that the loads presented to a pumping unit by a column of fluid and sucker rod that are often a mile long are extremely high and asymmetrical. Accordingly, a pumping unit designed for use with an oil well lift pump must minimize the joint and pin forces within the pumping unit, present as constant a level of torque as possible to the prime mover, and minimize force fluctuations and loading on the sucker rod. Moreover, the pumping unit should be compact in order to both reduce inertia problems and to limit the footprint of the unit. Moreover, because oil well pumping units are designed to operate continuously for months at a time, reliability is a paramount design factor which cannot be compromised in favor of other design considerations.

SUMMARY OF THE INVENTION

The pumping unit in accordance with the present invention resolves many of the problems outlined above. In particular, the pumping unit hereof is particularly adapted for coupling a rotating prime mover to the sucker rod of an oil well pumping mechanism without the need for a conventional walking beam, horsehead, or flexible cable. The pumping unit hereof presents approximately one-third the footprint of most pumping units having an equal stroke length. Moreover, torque, loading, and power requirements are reduced by the present invention as compared to a conventional pumping unit having equal stroke length. Costs related to manufacturing the pumps are reduced as compared to a conventional pump, because the unit hereof is smaller and because the reduced torque requirements of the unit allow for a smaller prime mover. The reduced pin forces contribute to reliability and reduced maintenance requirements. Higher cyclical rates, and therefore increased pumping rates, are attainable by the pumping unit hereof, since the pumping unit is not restricted by the free fall downstroke operating requirement of a sucker rod connected to a flexible cable. Reliability is improved through the elimination of the flexible cable and the reduced loading effected by the mechanism.

The pumping unit in accordance with the present invention include a generally V-shaped floating link and first and second grounded links coupling the floating link to an upright support frame. A driving dyad comprising a rotating crank and a connecting link connects a rotating prime mover to the floating link. The apex of the floating link is directly connected to the terminal end of the polished rod (sucker rod) of an oil well lift pump. The counterweight for the pumping unit is preferably directly attached to one of the two grounded links.

The characteristics of the pumping unit, including stroke length, footprint, adherence to a true straight line output, driving torque, loading and input power requirements are all dependent on the relative placings and dimensions of the driving dyad, floating link and grounded links. The pumping unit includes adjusting mechanisms for adjusting the lengths of both members of the driving dyad, and for adjusting the connection point of the driving dyad to the floating link, so as to adjust for different stroke lengths, sucker rod angles, and crank angle offsets. The connection point of the polished rod to the floating link is vertically adjustable for selection of the angle of attack of the polished rod relative to the horizontal. Moreover, as is set forth in the detailed description of the invention below, the relative dimensions and positions of the floating link, grounded links, and driving dyad are held within predetermined bounds so as to optimize the performance of the pumping unit.

DETAILED DESCRIPTION OF THE DRAWINGS

Figure 3:
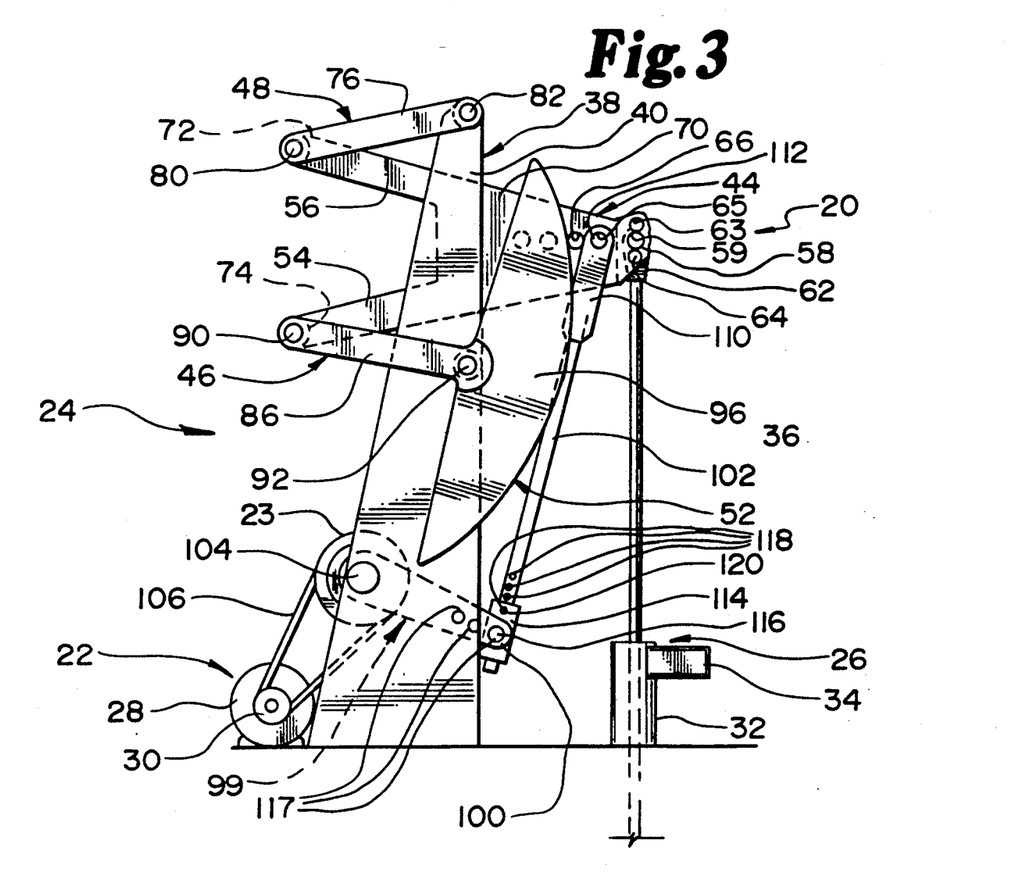
FIG. 3 is a side elevational view of a pumping mechanism in accordance with the present invention.
Figure 4:
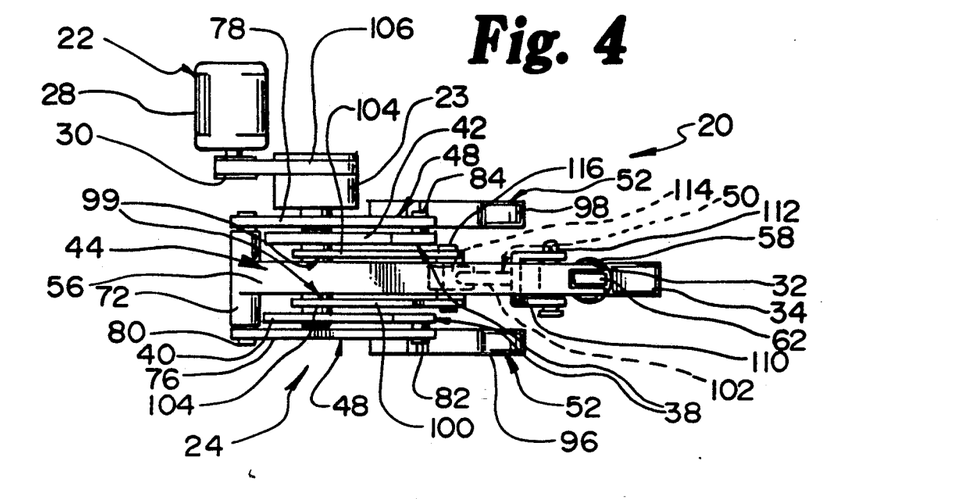
FIG. 4 is a plan view of the pumping mechanism depicted in FIG. 3.

Referring to FIGS. 3 and 4, an oil well pumping mechanism 20 includes prime mover 22, gear reducer 23, pumping unit 24, and lift pump assembly 26. The prime mover 22 comprises an electric motor 28 having output belt pulley 30. The lift pump assembly 26 includes well head 32 having stuffing box 34, polished rod (sucker rod) 36, and a conventional lift pump (not shown in FIGS. 3 and 4).

Pumping unit 24 includes a support frame 38 comprised of spaced apart, identical stanchions 40, 42, floating link 44, bottom grounded link 46, top grounded link 48, and driving dyad 50. Counterweight 52 is carried by the bottom grounded link 46.

Floating link 44 comprises a generally V-shaped link having first and second arms 54, 56. King pin 58 is received through aperture 59 in the apex 60 of the floating link 44, for pivotally coupling the terminal end 62 of the polished rod 36 to the apex 60 of the floating link 44. The king pin 58 is alternatively receivable within apertures 63, 64. A plurality of clevis pin receiving apertures 65, 66, 68, 70 are bored through the floating link. 44. The upper, second floating link arm 56 includes a pivot channel 72 at its terminal end. Likewise, the bottom, first grounded link arm 46 includes pivot channel 74 at its terminal end.

Top grounded link 48 includes spaced apart top grounded link members 76, 78 for coupling the second arm of floating link 44 to the stanchions 40, 42 of support frame 40. Pivot pin 80 couples the top grounded link members 76, 78 to the floating link pivot channel 72, and defines the upper floating link floating pivot axis. The top grounded link members 76, 78 are coupled to the support frame 40 by pivot pins 82, 84 that define the upper grounded pivot axis of the pumping unit.

Bottom grounded link 46 includes spaced apart bottom grounded link members (only one member 86 being shown in the drawings). Pivot pin 90 couples the bottom grounded link members to the pivot channel 74 of the floating link first arm 54, and defines the lower floating link pivot axis. The grounded link members are pivotally coupled to support frame stanchions 40, 42 by pivot pins (only one pivot pin 92 being shown in the drawings) that define the lower grounded pivot axis.

Counterweight 52 comprises spaced apart counterweight members 96, 98 fixedly attached to respective bottom grounded link members. The centers of gravity of the counterweight members 96, 98 are positioned to be generally in line with the longitudinal axes of their respective grounded link members. Moreover, the frusto circular shape of the counterweight members 96, 98 is designed to position the respective centers of gravity as close as possible to their associated pivot pin 92.

Driving dyad 50 includes crank arm 99 having spaced, parallel crank arm members 100, 101, and connecting link 102. The crank arm members 100, 101 are fixedly mounted to crank axle 104. The crank axle 104 is rotatably coupled to the prime mover 22 via drive belt 106 and reducer 23.

Connecting link 102 includes uppermost clevis 110 pivotally coupled to floating link 44 by clevis pin 112 to define the upper dyad pivot axis. The lowermost portion of the connecting link 102 is received within sleeve 114. Sleeve 114 is pivotally coupled to the crank arm members 100, 101 by crank pivot pin 116 to define the lower dyad pivot axis. The pivot pin 116 is receivable within a selected one of a plurality of crank arm length adjustment apertures 117. Connecting link 102 includes a plurality of bored through adjustment channels 118. The sleeve 114 and connecting link 102 are connected together by clevis pin 120 received through a selected one of the adjustment channels 118.

Figure 5:
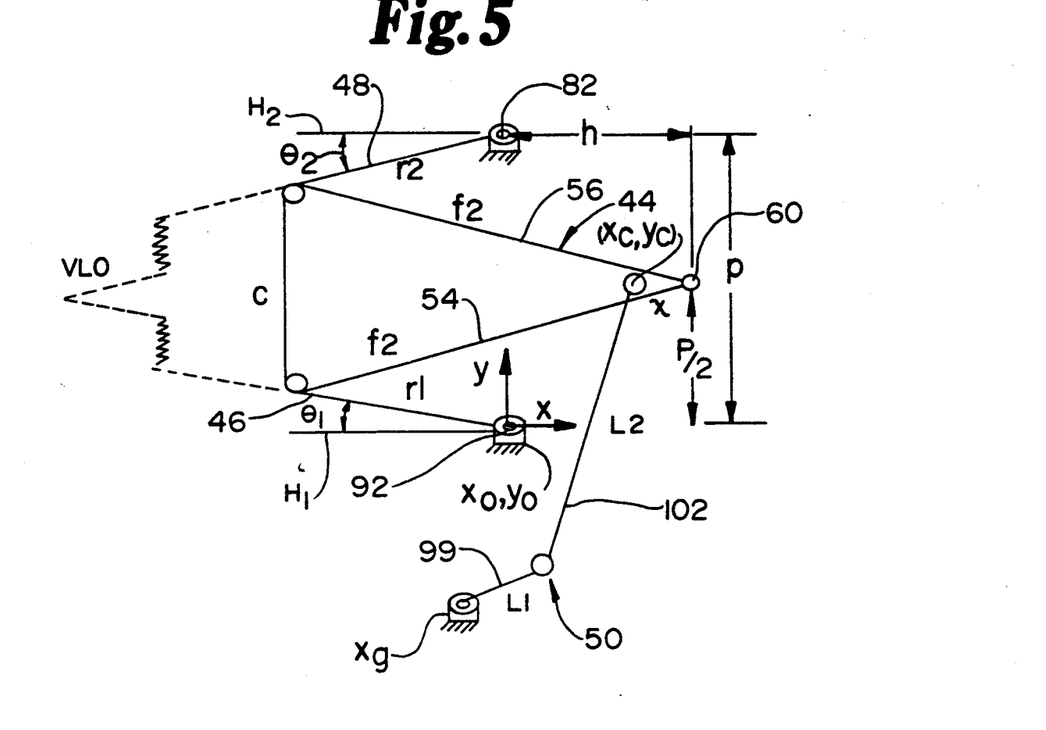
FIG. 5 is a schematic diagram of a pumping unit in accordance with the present invention depicting various variables defining the relationships of dimension and position of the elements of the pumping unit.

The qualitative performance of the pumping unit 24 is determined by the relative positions and sizes of the floating link 44, grounded links 46, 48, and driving dyad 50. FIG. 5 is a schematic diagram of the pumping unit 24 depicting various variables used to define the relationships of size and position of the elements of the pumping unit 24. The elements of the pumping unit 24 in the schematic depiction of FIG. 5 are annotated with the same numeral, assigned in the pictorial representations of FIGS. 3 and 4.

Table 1 below defines the variables depicted in FIG. 5. An x axis and y axis are annotated on FIG. 5, with the origin $(x_0, Y_0)$ at the bottom grounded link pivot axis. Note also that reference lines H1 and H2 are provided for horizontal reference.

TABLE 1

| | |
|---|---|
| $f_1$ | floating link bottom arm length |
| $f_2$ | floating link upper arm length |
| $r_1$ | bottom grounded link length |
| $r_2$ | upper grounded link length |
| $L_1$ | dyad crank arm length |
| $L_2$ | dyad connecting link length |
| c | distance between upper floating link pivot axis and lower floating link pivot axis |
| h | horizontal distance between upper grounded pivot axis and floating link apex |
| p | distance between ground pivot points (82, 92) |
| p/2 | midpoint between ground pivot points |
| $\gamma$ | angle between upper and lower floating link arms |
| $\theta_1$ | angle between bottom grounded link and H1 when apex of floating link is at p/2 |
| $\theta_2$ | angle between upper grounded link and H2 when apex of floating link is at p/2 |
| $VL_o$ | virtual lever origin; the intersection point of the extension of the upper grounded link and the bottom grounded link |

The output of the pumping unit 24 at the apex 60 of floating link 44 will follow good straight line motion along its path of travel, when the crank arm 99 is rotated in a circular direction and the criteria expressed in the following equations are met:

$$\theta_1 = \theta_2 \qquad (1)$$

$$r_1 = r_2 \qquad (2)$$

$$c = p - 2r_1 \sin \theta_1 \qquad (3)$$

$$c = 2(r_1 + h) \sin \tfrac{1}{2}\gamma \qquad (4)$$

$$c = 2(r_1 \cos \theta_1 + h) \tan \tfrac{1}{2}\gamma \qquad (5).$$

Adherence to straight line motion is an important performance criteria of the pumping unit 24. Of equal importance, however, are the value of the virtual lever length and the compactness of the mechanism, as discussed below.

Referring to FIG. 5, the virtual lever origin ($VL_0$) is the point where the linear extensions of the upper grounded link 48 and the bottom grounded link 46 intersect. The virtual lever length VL is the distance from the virtual lever origin $VL_0$ to the apex 60 of the floating link 44 when the apex 60 is at midpoint p/2, it being understood that the virtual lever origin $VL_0$ will shift up and down as the pumping unit 24 operates through a pumping cycle. The virtual lever length origin $VL_0$ is equivalent to the instant center point of the floating link 44 relative to ground. Expressed in terms of the variables of Table 1 and FIG. 5, the virtual lever length VL is:

$$VL = |p/2 \tan(90 - \theta_1)| + h \qquad (6).$$

As will be appreciated by those skilled in the art, a longer virtual lever length (VL) will provide a greater power transmission advantage in translating the rotating energy of the prime mover 22 into lifting energy of the sucker rod 36. More particularly, joint forces in the mechanism are decreased as VL is increased.

The compactness of the pumping unit 24 can be expressed as the overall length of the unit 24 times the stroke length p. With the apex 60 at point p/2, the compactness, or "area" AR, of the pumping unit 24 can be expressed in the terms of the variables of Table 1 as:

$$AR = (|r_1 \cos \theta_1| + h)p \qquad (7).$$

Equations (6) and (7) express the fact that increasing h improves the virtual lever length VL, but at the same time degrades the compactness value AR. Moreover, increasing $\theta_1$ degrades the virtual lever length VL, but at the same time improves the compactness value AR. Selection of values for $\theta_1$ and h that optimize both the virtual lever length VL and compactness value AR is complicated by the requirements of equations (1)–(5) that dictate the criteria for straight line motion of the apex 60 of the floating link 44.

The values for VL and AR can be normalized (i.e., made dimensionless) by specifying that $$p = 1 \qquad (8),$$

and using the following expressions:

$$VL_n = 1 - |VL - VL\text{max}|/(VL\text{max} - VL\text{min}) \qquad (9)$$

$$AR_n = 1 - |AR - AR\text{min}|/(AR\text{max} - AR\text{min}) \qquad (10).$$

The values $VL_{max}$, $VL_{min}$, $AR_{max}$, $AR_{min}$ are the maximum and minimum values of VL and AR for a given mechanism when considering all values of $\theta_1$ and $\gamma$. The optimum $VL_n$ (longest virtual lever arm) is accordingly assigned a normalized value of 1. Lever arm lengths less than the longest result in $VL_n$ being less than 1. The optimum $AR_n$ (smallest area) is also a normalized value of 1, with areas larger than the optimum being assigned a normalized value of less than 1.

Assuming the value of the virtual lever VL and the value for the compactness AR to be equally important, an evaluation of a particular pumping mechanism for comparison purposes can be made by averaging the $VL_n$ and $AR_n$ values:

$$AVG = (VL_n = AR_n)/2 \qquad (11).$$

The relative importance of virtual lever and compactness could be expressed as other than being equal through a variation of equation (11) where either $VL_n$ or $AR_n$ is multiplied by an appropriate factor.

Equations (1)–(5) and (8) provide a problem defined by six equations with eight unknowns. To solve the equations, two of the variables must be preselected. The computations are simplified by selecting values for $\theta_1$ and $\gamma$, and solving the equations for the other variables. For instance, a value for $\gamma$ (the angle defined by the lower and upper floating link arms 54, 56), can be selected, and the value for $\theta_1$ (the angle defined by the bottom grounded link $r_1$ relative to the horizontal $H_1$ when the apex 60 is at midpoint p/2) can be varied along a range of 0° to 90°, with $\gamma$ held at the selected value. Values of the other six variables, c, h, $r_1$, $r_2$, $\theta_2$, can then be determined, and the values for the virtual lever $VL_n$ and compactness $AR_n$ can be computed. A family of curves plotting $AR_n$, with $\gamma$ selected at intervals of about 15 degrees, and with $\theta_1$ varied through the range of 0°-90°, is presented in FIG. 6. A similar family of curves plotting $VL_n$ is presented in FIG. 7.

Figure 6:
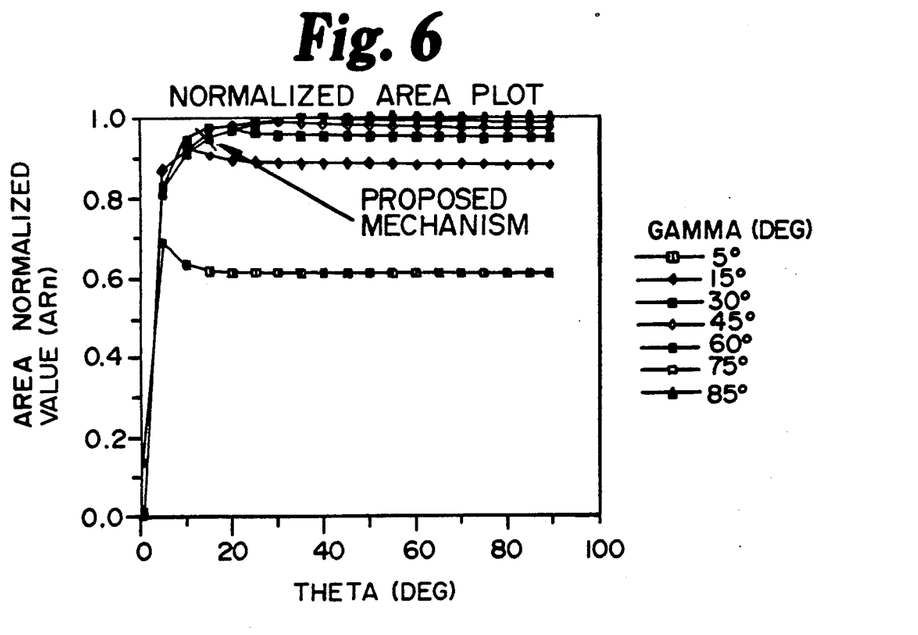
FIG. 6 is a set of graphs depicting normalized area ($AR_n$) of the pumping unit in accordance with the present invention as a function of the angle of the lower grounded link to the horizontal at midstroke (angle $\theta_1$) and as a function of the angle defined by the arms of the floating link (angle $\gamma$)

Referring to FIG. 6, it can be qualitatively determined that improvements in $AR_n$ are basically flat for values of $\theta_1$ greater than about 15°. Likewise, referring to FIG. 7, it can be determined that improvements in $VL_n$ are basically flat for values of $\theta_1$ greater than about 15°. It can also be determined, from comparing FIG. 6 and FIG. 7, that the effect of increasing $\gamma$ improves the value for $AR_n$, but degrades the value of $VL_n$.

Figure 8:
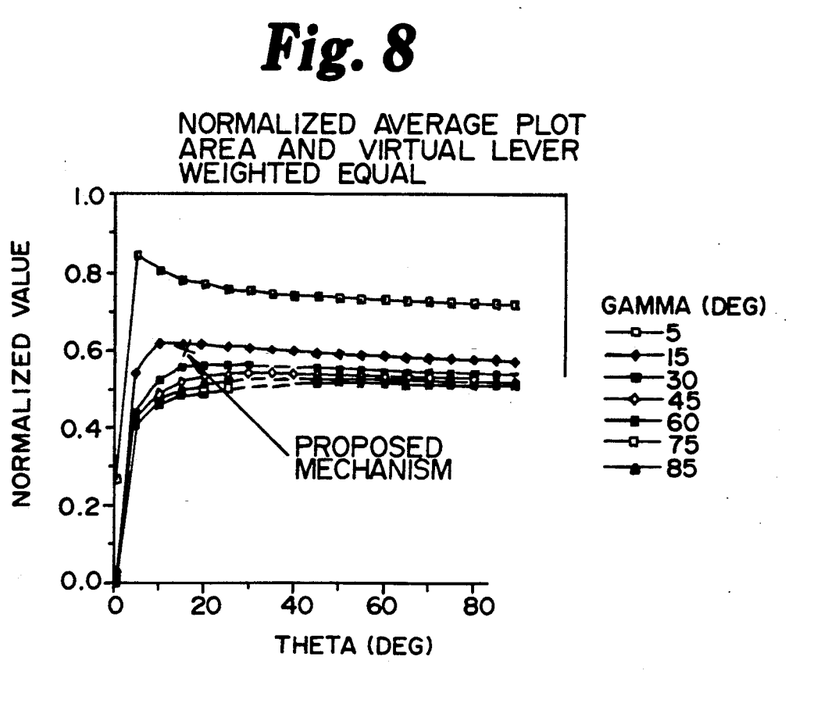
FIG. 8 is a set of graphs depicting the average of normalized area ($AR_n$) and normalized virtual lever length ($VL_n$) as a function of the angle of the lower grounded link to the horizontal at midstroke (angle $\theta_1$), and as a function of the angle defined by the arms of the floating link (angle $\gamma$) with $AR_n$ and $VL_n$ weighted equally.

Referring to FIG. 8, the normalized average value (AVG) of area $AR_n$ and virtual lever $VL_n$ is plotted as a family of curves, with $\gamma$ selected at intervals of about 15°, and with $\theta_1$ varied through a range of 0°-90°. FIG. 8 demonstrates that improvements in AVG are essentially flat for values of $\theta_1$ greater than about 15°.

Figure 7:
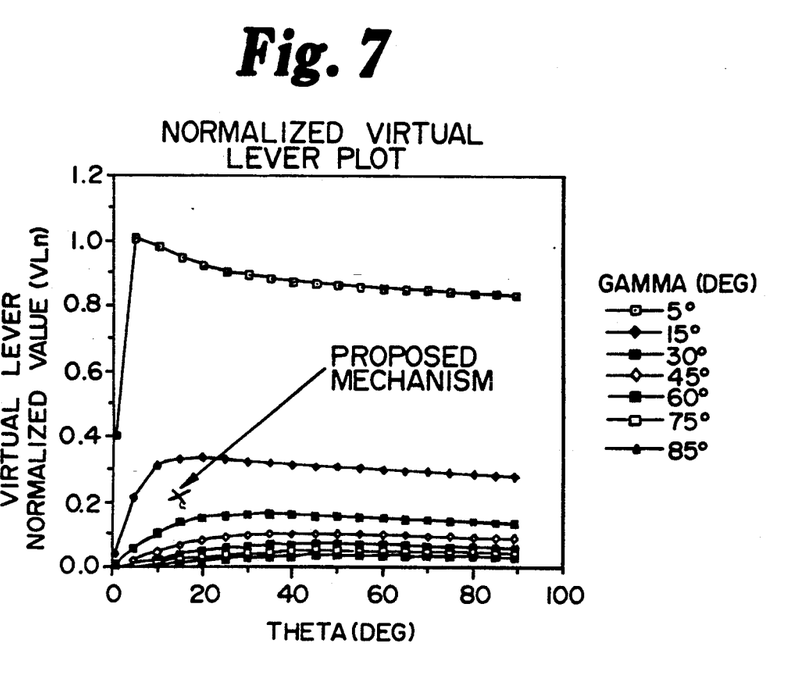
FIG. 7 is set of a graphs depicting normalized virtual lever length ($VL_n$) of the pumping unit in accordance with the present invention as a function of the angle of the lower grounded link to the horizontal at midstroke (angle $\theta_1$), and as a function of the angle defined by the arms of the floating link (angle $\gamma$)

FIGS. 6, 7, 8 can be used in conjunction with a mechanical linkage synthesis software program, such as the Lincages-4 program available from Minnesota Technology Transfer Inc. (MINTT, Inc.), 1957 3rd Street Southwest, New Brighton, Minn. 55112, to establish optimum values and acceptable ranges of $\theta_1$ and $\gamma$. The range of acceptable values of $\theta_1$ so determined is:

$$1° < \theta_1 < 40°$$

and the preferred value of $\theta_1$ is $$\theta_1 = 16.36°.$$

The range of acceptable values of $\gamma$ so determined is:

$$5° < \gamma < 45°$$

and the preferred value of is:

$$\gamma = 25.45°.$$

It will be recalled that equations (1)–(5) and (8) define the criteria for straight line output motion for the apex 60 of floating link 44. Once values of $\theta_1$ and $\gamma$ are selected, the problem set becomes one of six equations with six unknown variables. Values for the six variables can accordingly be determined by solving the equations. The question then arises as to what the optimum values of the six variables (c, h, $r_1$, $r_2$, p, $\theta_2$) are, given the optimum values of $\theta_1$ and $\gamma$, and how much the variables (c, h, $r_1$, $r_2$, p, $\theta_2$) can be varied from the optimum without unacceptably degrading the straight line motion output of the mechanism. Again using a linkage synthesis process, such as the Lincages-4 system referred to above, optimum values (in dimensionless units) can be established as:

$$r_1 = 0.769$$

$$r_2 = 0.802$$

$$c = 0.557$$

$$h = 0.481$$

$$\theta_2 = 16.33°.$$

Equations (1) and (2), repeated below, express a requirement for symmetry by stating that the grounded link lengths, and angles $\theta_1$ and $\theta_2$, be identical:

$$r_1 = r_2 \tag{1}$$

$$\theta_1 = \theta_2 \tag{2}$$

Acceptable pumping action can be accomplished by the pumping unit 24, however, when the variations from symmetry (i.e., the difference in lengths of $r_1$ and $r_2$ and difference in angle of $\theta_1$ and $\theta_2$) fall within the following ranges of dimensionless units:

$$r = |r_2 - r_1| < 0.41$$

$$\theta = |\theta_2 - \theta_1| < 15°.$$

Finally, the acceptable derivations of h and r from the requirements of equations (1)–(5) and (8) can be determined using equations (12)–(15) below. In particular, acceptable straight line motion is attained when the difference ($\Delta H$) between the actual value of h (h act) and a calculated value of h (h cal) is within the range of 0 to 2.9 in dimensionless units, as calculated below:

$$\Delta H = |h \text{ act} - h \text{ cal}| \tag{12}$$

$$h_{cal} = \frac{\frac{\sin 1/2\gamma - \cos(\theta_1)\tan 1/2\gamma}{\cos(\theta_1)\tan 1/2\gamma + \sin(\theta_1)}}{2\left(\frac{(\sin 1/2\gamma + \sin(\theta))\tan 1/2\gamma}{\cos(\theta_1)\tan 1/2\gamma + \sin(\theta)}\right) - \sin 1/2\gamma} \tag{13}$$

Considering r, acceptable straight line motion is attained when the difference ($\Delta R$) between the actual value of r ($r_1$) and a calculated value of r (r cal) is within the range of 0 to 1.0 in dimensionless units, as calculated below:

$$h_{cal} = \frac{\frac{\sin 1/2\gamma - \cos(\theta_1)\tan 1/2\gamma}{\cos(\theta_1)\tan 1/2\gamma + \sin(\theta_1)}}{2\left(\frac{(\sin 1/2\gamma + \sin(\theta))\tan 1/2\gamma}{\cos(\theta_1)\tan 1/2\gamma + \sin(\theta)}\right) - \sin 1/2\gamma} \tag{15}$$

It will be appreciated that if a value for either $h_{cal}$ or $r_{cal}$ is selected the other of the two variables is fixed by the selection of the other.

Shifting the clevis 110 of connecting link 102 between the various clevis pin receiving apertures 65, 66, 68, 70 adjusts the amount of crank angle offset of the driving dyad 50. More specifically, as the clevis pin 112 is moved leftwardly, as seen in FIG. 3, the crank angle offset is decreased, resulting in the speed of the upstroke of the polished rod 36 being increased (assuming counter clockwise rotation of crank arm 99, as depicted in FIG. 3), and the speed of the downstroke of the rod 36 being decreased. Adjusting the crank angle offset for decreased speed on the upstroke and increased speed on the downstroke is desired so as to provide lower polished rods loads on the upstroke.

The preferred location ($x_c$, $y_c$) of the apertures 65, 66, 68, 70 is to the right of the origin ($x_o$, $y_o$), that is, ($0 < x_c$), and between 0.25 and 0.75 units above the origin ($0.25 < Y_c < 0.75$). The amount of crank angle offset is also determined by the ratio of the length of the connecting link 102 ($L_2$) to the length of the crank arm 99 ($L_1$), and by the horizontal position of the crank angle 104 ($x_g$). In that regard, the ratio of $L_2$ to $L_1$ is preferably greater than 2 ($L_2/L_1 > 2.0$), and the location of $x_g$ is preferably to the left of the origin ($X_g < 0$), as depicted in FIG. 5.

The length $L_2$ of the connecting link 102 of the driving dyad 50 is adjustable by shifting the connecting link 102 within sleeve 114. The length $L_1$ of the crank arm 99 can be adjusted by shifting the sleeve 114 between adjustment apertures 117 of the crank arm 99. Shortening the length $L_2$ of the connecting link 102, and length $L_1$ of the crank arm 99, as the clevis pin connection to the floating link 44 is shifted leftwardly, as seen in FIG. 3, allows for repositioning of the apex 60 at midstroke as the connection point of the clevis pin is shifted inwardly. Moreover, the stroke of the polished rod 36 can be shortened or lengthened by shortening or lengthening the length $L_1$ of crank arm 99. Once the length $L_1$ of crank arm 99 is adjusted to a desired length, the length $L_2$ of connecting link 102 can be adjusted to reposition the apex 60 of floating link 44 at the vertical position (p/2).

The angle of the polished rod 36 relative to the ground can be adjusted by shifting the king pin 58 connecting the polished rod 36 to the floating link 44 between apertures 59, 63, and 64. In particular, the polished rod 36 is normal to the horizontal when the king pin 58 is in the center aperture 59, is slanted downwardly and inwardly towards the base of pumping unit 24 when king pin 58 is received in the lower aperture 64, and is slanted downwardly and away from the base when the king pin 58 is received within the upper aperture 63.

A counterweight is preferably positioned such that the instantaneous power requirement for moving the counterweight is equal in magnitude and opposite in sign to the instantaneous power requirement of the load to which it is attached. Moreover, the acceleration of the counterweight should be minimized to reduce torque loading on the prime mover. Conventional pumping units often place a counterweight on the pumping unit crank arm. The crank arm 99 in the present invention is rotated at a constant speed, and therefore the counterbalance mass contributes essentially no inertial torque loading to the prime mover. However, while the power requirement of the crank arm 99 (and an attached counterweight) is almost a pure sinusoid, the power requirement of the polished rod 36 is not. The counterweight 52 in accordance with the present invention is accordingly preferably placed on the lower grounded link 46, rather than the crank arm 99, since the power requirement of the lower grounded link 46 more closely approximates the opposite of the power requirement profile of the polished rod 36. The center of gravity of each of the counterweight members 96 is preferably aligned with the longitudinal axis of its respective lower grounded link member 86 to which it is attached.

We claim:

1. An apparatus for providing a reciprocating, generally linear output motion as presented by a path tracer point as it travels along a path of travel between first and second limit points, said apparatus defining a central position when said path tracer point is positioned generally mid-way between said first and second limit points from a generally rotating input motion source, comprising:
   a support frame;
   a linkage assembly having—
   a floating link;
   a first grounded link having a floating end operably, pivotally coupled to said floating link to present a first floating pivot axis and an opposed end operably, pivotally coupled to said support frame to present a first grounded pivot axis point;
   a second grounded link having a floating end operably, pivotally coupled to said floating link to present a second floating pivot axis and an opposed end operably, pivotally coupled to said support frame to present a second grounded pivot axis; and
   a driving dyad having a first member operably coupled to said input motion source and a second member operably coupled to said floating link to present a driving pivot axis, said first and second floating pivot axes being on the same side of the line defined by said first and second grounded pivot axes, when said apparatus is in said centered position.

2. The invention as claimed in claim 1, said floating link comprising a generally V-shaped link having first and second arms intersecting at a floating link apex, said apex being generally coincidental with said path tracer point.

3. The invention as claimed in claim 2, said second member of said driving dyad being pivotally coupled to said floating link proximal to said apex about a driving pivot axis.

4. The invention as claimed in claim 3, including means for adjusting the position of said driving pivot axis along said floating link.

5. The invention as claimed in claim 2, including means for coupling a load to said floating link proximal said apex at a load bearing pivot axis.

6. The invention as claimed in claim 5, including means for adjusting the position of said load bearing pivot axis along said floating link apex.

7. The invention as claimed in claim 1, including means for adjusting the length of said driving dyad first member.

8. The invention as claimed in claim 1, including means for adjusting the length of said driving dyad second member.

9. The invention as claimed in claim 1, including counterbalancing means operably carried by one of said grounded links.

10. The invention as claimed in claim 9, said one grounded link having a longitudinal axis, said counterbalance means comprising a weight having a center of gravity generally aligned with said longitudinal axis.

11. The invention as claimed in claim 1, said floating link comprising a generally V-shaped link having first and second arms defining a floating link angle therebetween and presenting a floating link apex, said apex being generally coincidental with said path tracer point and said floating link angle being not less than about five degrees and not more than about forty-five degrees.

12. The invention as claimed in claim 11, said path tracer point having a reciprocating, generally linear output motion along a path of travel having length p, each of said grounded links defining an angle with the horizontal when said apex is positioned at midpoint p/2, said angles being not less than about 1° and not more than about forty degrees.

13. The invention as claimed in claim 12, said first grounded link defining angle $\theta_1$, relative to the horizontal and said second grounded link defining angle $\theta_2$ relative to the horizontal, when said apex is positioned at said midpoint p/2, the difference between $\theta_1$ and $\theta_2$ being not more than about fifteen degrees.

14. The invention as claimed in claim 1, the lengths of said grounded links being generally equal to each other.

15. The invention as claimed in claim 1, one of said grounded links being not more than about 30% shorter than the other of said grounded links.

16. The invention as claimed in claim 1, the length of said dyad second member being at least twice as long as the length of said dyad first member.

17. The invention as claimed in claim 1, each of the couplings between said linkage assembly, said driving dyad, said support frame and ground comprising revolute joints.

18. A pumping mechanism for shifting a reciprocating member along a reciprocating, linear path of travel, said pumping mechanism being powered by a rotating prime mover having a prime mover axis of rotation, comprising:

a support frame;

a linkage assembly including a floating link member having a first end operably coupled to said reciprocating member and grounded link means defining at least two spaced apart pivot axes for operably coupling said floating link to said support frame, said grounded link means comprising first and second grounded link members, said floating link member comprising a generally V-shaped link having first and second arms intersecting at a floating link apex, said apex comprising said floating member first end and said generally linear path of travel being inscribed by said apex; and dyad driving means for operably coupling said first end of said floating link to said prime mover in driving engagement therewith, whereby said floating link member is spaced apart from said support frame by at least two pivot axes and said reciprocating member is driven along said linear path of travel when said prime mover is rotated about said axis of rotation.

19. The invention as claimed in claim 18, said dyad driving means comprising a driving dyad having a first member operably coupled to said rotating prime mover and a second member operably coupled to said floating link, said first and second driving dyad members being pivotally coupled together at a dyad pivot axis.

20. The invention as claimed in claim 19, said second member of said driving dyad being pivotally coupled to said floating link proximal said apex about a driving pivot axis.

21. The invention as claimed in claim 20, including means for adjusting the position of said driving pivot axis along said floating link.

22. The invention as claimed in claim 19, each of the couplings between said linkage assembly, said driving dyad, said support frame and ground comprising revolute joints.

23. The invention as claimed in claim 19, including means for adjusting the length of said driving dyad first member.

24. The invention as claimed in claim 19, including means for adjusting the length of said driving dyad second member.

25. The invention as claimed in claim 19, the length of said dyad second member being at least twice as long as the length of said dyad first member.

26. The invention as claimed in claim 18, said first grounded link having a grounded end pivotally coupled to said support frame at a first grounded link pivot axis and a floating end pivotally coupled to the first arm of said floating link, and said second grounded link having a grounded end pivotally coupled to said support frame at a second grounded link pivot axis and a floating end pivotally coupled to the second arm of said floating link.

27. The invention as claimed in claim 18, including means for coupling a load to said apex of said floating link about a load bearing pivot axis.

28. The invention as claimed in claim 27, including means for adjusting the position of said load bearing pivot axis along said floating link apex.

29. The invention as claimed in claim 18, including counterbalancing means operably carried by one of said grounded links.

30. The invention as claimed in claim 29, said one grounded link having a longitudinal axis, said counterbalance means comprising a weight having a center of gravity generally aligned with said longitudinal axis.

31. The invention as claimed in claim 18, one of said grounded links being not more than about 30% shorter than the other of said grounded links.

32. The invention as claimed in claim 18, said first and second arms defining a floating link angle therebetween to present said floating link apex, said apex comprising said floating link first end, said floating link angle being not less than about five degrees and not more than about forty-five degrees.

33. The invention as claimed in claim 32, said floating link apex tracing said reciprocating, generally linear path of travel, said path of travel having length p, each of said grounded links defining an angle with the horizontal when said apex is positioned at midpoint p/2, said angles being not less than about 1° and not more than about forty degrees.

34. The invention as claimed in claim 33, said first grounded link defining angle $\theta_1$, relative to the horizontal and said second grounded link defining angle $\theta_2$, relative to the horizontal when said apex is positioned at said midpoint p/2, the difference between $\theta_1$, and $\theta_2$ being not more than about fifteen degrees.

35. The invention as claimed in claim 18, the lengths of said grounded links being generally equal to each other.

36. A pumping mechanism for shifting a reciprocating member along a reciprocating, linear path of travel, said pumping mechanism being powered by a rotating prime mover having a prime mover axis of rotation, comprising:

a support frame;

linkage mechanism means, having a plurality of pivot points, shiftably supported by said support frame for operably coupling said reciprocating member to said prime mover whereby said reciprocating member is driven along said linear path of travel; and counterbalancing means operably coupled to said linkage mechanism for providing a counterbalance load to said prime mover, said counterbalance means being spaced apart from said prime mover by at least one of said pivot points;

driving assembly means comprising a driving dyad having a first member operably coupled to said rotating prime mover and a second member operably coupled to said reciprocating member; and a linkage assembly having a floating link and first and second grounded links operably coupling said floating link to said support frame, said floating link comprising a generally V-shaped link having first and second arms intersecting at a floating link apex, said generally linear output motion being traced by said apex.

37. The invention as claimed in claim 36, said first grounded link having a grounded end pivotally coupled to said support frame at a first grounded link pivot axis and a floating end pivotally coupled to the first arm of said floating link, and said second grounded link having a grounded end pivotally coupled to said support frame at a second grounded link pivot axis and a floating end pivotally coupled to the second arm of said floating link.

38. The invention as claimed in claim 36, said second member of said driving dyad being pivotally coupled to said floating link proximal said apex about a driving pivot axis.

39. The invention as claimed in claim 22, including means for adjusting the position of said driving pivot axis along said floating link.

40. The invention as claimed in claim 36, including means for adjusting the length of said driving dyad first member.

41. The invention as claimed in claim 36, including means for adjusting the length of said driving dyad second member.

42. The invention as claimed in claim 36, including means for coupling a load to said apex of said floating link about a load bearing pivot axis.

43. The invention as claimed in claim 42, including means for adjusting the position of said load bearing pivot axis along said apex.

44. The invention as claimed in claim 36, said floating link comprising a generally V-shaped link having first and second arms defining a floating link angle therebetween and presenting a floating link apex, said floating link angle being not less than about five degrees and not more than about forty-five degrees.

45. The invention as claimed in claim 44, said floating link apex enscribing said reciprocating, generally linear output motion along a path of travel having length p, each of said grounded links defining an angle with the horizontal when said apex is positioned at midpoint p/2, said angles being not less than about 1° and not more than about forty degrees.

46. The invention as claimed in claim 45, said first grounded link defining angle $\theta_1$, relative to the horizontal and said second grounded link defining angle $\theta_2$, relative to the horizontal when said apex is positioned at said midpoint p/2, the difference between $\theta_1$ and $\theta_2$ being not more than about fifteen degrees.

47. The invention as claimed in claim 36, the lengths of said grounded links being generally equal to each other.

48. The invention as claimed in claim 36, one of said grounded links being not more than about 30% shorter than the other of said grounded links.

49. The invention as claimed in claim 36, the length of said dyad second member being at least twice as long as the length of said dyad first member.

50. The invention as claimed in claim 36, each of the couplings between said linkage assembly, said driving dyad, said support frame and ground comprising revolute joints.

* * * * *

UNITED STATES PATENT AND TRADEMARK OFFICE
CERTIFICATE OF CORRECTION

PATENT NO. : 5,253,541

DATED : October 19, 1993

INVENTOR(S) : Kevin L. Mangle and Arthur G. Erdman

It is certified that error appears in the above-identified patent and that said Letters Patent is hereby corrected as shown below:

Col. 8, lines 35-39, delete calculation (15) and insert the following:

$$\Delta R = |r_1 - r\,cal\,| \qquad (14)$$

$$r_{cal} = \frac{1 - 2h_{cal}\sin 1/2\,y}{2(\sin(0_1) + \sin 1/2\,y)} \qquad (15)$$

Col. 8, line 55 delete "rods" and insert -- rod -- therefor.

Signed and Sealed this

Thirty-first Day of May, 1994

BRUCE LEHMAN

*Attest:*

*Attesting Officer*   Commissioner of Patents and Trademarks